US012728350B2

(12) United States Patent
Zhang et al.

(10) Patent No.: US 12,728,350 B2
(45) Date of Patent: Sep. 8, 2026

(54) CHARACTER JUMP CONTROL METHOD AND APPARATUS IN GAME, TERMINAL DEVICE AND STORAGE MEDIUM

(71) Applicant: NETEASE (HANGZHOU) NETWORK CO., LTD., Zhejiang (CN)

(72) Inventors: Qichuan Zhang, Zhejiang (CN); Junhong Li, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 643 days.

(21) Appl. No.: 18/037,927

(22) PCT Filed: Jun. 24, 2022

(86) PCT No.: PCT/CN2022/100956
§ 371 (c)(1),
(2) Date: May 19, 2023

(87) PCT Pub. No.: WO2023/000916
PCT Pub. Date: Jan. 26, 2023

(65) Prior Publication Data
US 2024/0009569 A1 Jan. 11, 2024

(30) Foreign Application Priority Data
Jul. 23, 2021 (CN) ......................... 202110834972.0

(51) Int. Cl.
*A63F 13/56* (2014.01)
*A63F 13/537* (2014.01)
(Continued)

(52) U.S. Cl.
CPC ............ *A63F 13/56* (2014.09); *A63F 13/537* (2014.09); *A63F 13/573* (2014.09); *A63F 13/58* (2014.09)

(58) Field of Classification Search
CPC ...... A63F 13/537; A63F 13/56; A63F 13/573; A63F 13/58; A63F 2300/64
See application file for complete search history.

(56) References Cited

U.S. PATENT DOCUMENTS 10,717,004 B2 * 7/2020 Buttner ................ A63F 13/573
10,888,785 B2 * 1/2021 Buttner ................ A63F 13/573
(Continued)

FOREIGN PATENT DOCUMENTS

CN 108905198 A 11/2018
CN 109568949 A 4/2019
(Continued)

OTHER PUBLICATIONS

SmashWiki Jump. Revised Jun. 29, 2021. 22 pages. <https://www.ssbwiki.com/index.php?title=Jump&oldid=1590838> (Year: 2021).*
(Continued)

*Primary Examiner* — William H Mcculloch, Jr.
(74) *Attorney, Agent, or Firm* — IP&T GROUP LLP

(57) ABSTRACT

A character jump control method and apparatus in a game, a terminal device and a storage medium are disclosed. The character jump control method in a game includes: displaying a jump control in the graphical user interface; and controlling the virtual character to perform a jump operation corresponding to an air jump from a first starting jump height in response to a received trigger operation for the jump control during a free fall of the virtual character in performing a ground jump, where the first starting jump height may be a current height of the virtual character in the game scene when the trigger operation is received, and the
(Continued)

Control the virtual character to move upward from the first starting jump height to a second maximum speed corresponding to the air jump according to a second acceleration and a second acceleration time corresponding to the air jump — S301

Control the virtual character to continue moving upwards, from a height at which the second maximum speed is reached, according to the second maximum speed, a lifting acceleration corresponding to the air jump and a preset gravitational acceleration until an upward motion speed drops to zero — S302

Control the virtual character to perform a free-fall motion at the preset gravitational acceleration — S303 ground jump and the air jump are of jump types with different acceleration modes.

18 Claims, 3 Drawing Sheets

(51) Int. Cl.
*A63F 13/573* (2014.01)
*A63F 13/58* (2014.01)

(56) References Cited

U.S. PATENT DOCUMENTS

| | | | | |
|---|---|---|---|---|
| 11,071,906 | B2 * | 7/2021 | Hemby | A63F 13/92 |
| 11,185,764 | B2 * | 11/2021 | Li | A63F 13/214 |
| 11,623,135 | B2 * | 4/2023 | Hemby | G09G 5/377<br>463/31 |
| 11,951,390 | B2 * | 4/2024 | Thorborg | A63F 13/358 |
| 12,303,782 | B2 * | 5/2025 | Fung | A63F 13/35 |
| 12,366,956 | B2 * | 7/2025 | Yang | A63F 13/573 |
| 2008/0024435 | A1 * | 1/2008 | Dohta | A63F 13/44<br>345/156 |
| 2011/0039625 | A1 * | 2/2011 | Sakai | A63F 13/69<br>463/43 |
| 2012/0242590 | A1 * | 9/2012 | Baccichet | A63F 13/42<br>345/173 |
| 2017/0197144 | A1 * | 7/2017 | Maa | H04M 1/026 |
| 2018/0200616 | A1 * | 7/2018 | Li | A63F 13/214 |
| 2019/0265882 | A1 * | 8/2019 | Nakahara | G06F 3/04845 |
| 2019/0381404 | A1 * | 12/2019 | Buttner | A63F 13/573 |
| 2021/0101074 | A1 * | 4/2021 | Hemby | G09G 5/377 |
| 2021/0279930 | A1 * | 9/2021 | Hutten | G06T 11/00 |
| 2021/0379489 | A1 * | 12/2021 | Thorborg | A63F 13/56 |
| 2022/0080308 | A1 * | 3/2022 | Fung | G06F 3/0488 |
| 2024/0009569 | A1 * | 1/2024 | Zhang | A63F 13/58 |

FOREIGN PATENT DOCUMENTS

| | | | |
|---|---|---|---|
| CN | 111318020 | A | 6/2020 |
| CN | 113426126 | A | 9/2021 |
| JP | 2005-319041 | A | 11/2005 |
| JP | 2016-135212 | A | 7/2016 |
| JP | 2018-187239 | A | 11/2018 |
| JP | 2020-039403 | A | 3/2020 |
| JP | 6745421 | B1 | 8/2020 |
| WO | 2019/179245 | A1 | 9/2019 |

OTHER PUBLICATIONS

SmashWiki Kirby (SSBU). Revised May 31, 2021. 36 pages. <https://www.ssbwiki.com/index.php?title=Kirby_(SSBU)&oldid=1580084> (Year: 2021).*

SmashWiki Warp. Revised Jun. 2, 2021. 4 pages. <https://www.ssbwiki.com/index.php?title=Warp&oldid=1580571> (Year: 2021).*

First Office Action for Chinese Patent Application No. 202110834972.0 issued by the Chinese Patent Office.

First Search of Priority for Chinese Patent Application No. 202110834972.0 issued by the Chinese Patent Office.

International Search Report for International Application No. PCT/CN2022/100956 issued by the international Searching Authority (Chinese Patent Office) on Aug. 30, 2022.

Written Opinion for International Application No. PCT/CN2022/100956 issued by the International Searching Authority (Chinese Patent Office) on Aug. 24, 2022.

Kenichiro Matsuura et al., ActionGame Algorithm Maniax, May 30, 2007, pp. 60-97, Mitsutoshi Nitta.

Oyz et al., The King of Fighters XIII, Monthly Arcadia, Enterbrain Inc., Jun. 30, 2010, pp. 30-39, vol. 11, Issue No. 8.

Armored Core 4, Famitsu Xbox 360, Enterbrain Inc., Apr. 3, 2007, pp. 54-59, vol. 6, Issue No. 5.

Office Action for Japanese Patent Application No. 2023-528293 issued by the Japanese Patent Office on May 21, 2024.

Notice of Allowance (=Notification to Grant Patent Right for Invention) for Japanese Patent Application No. 2023-528293 issued by the Japanese Patent Office on Oct. 1, 2024.

* cited by examiner

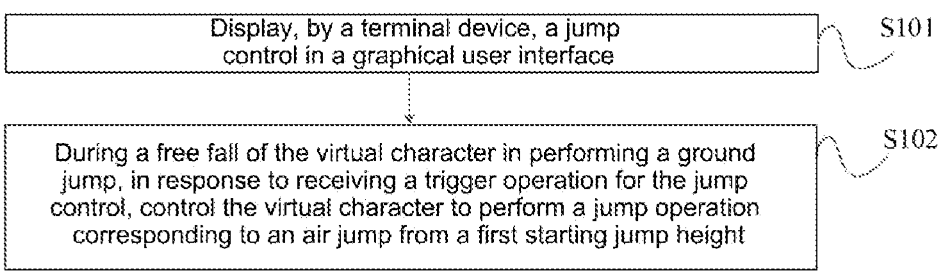
Fig. 1
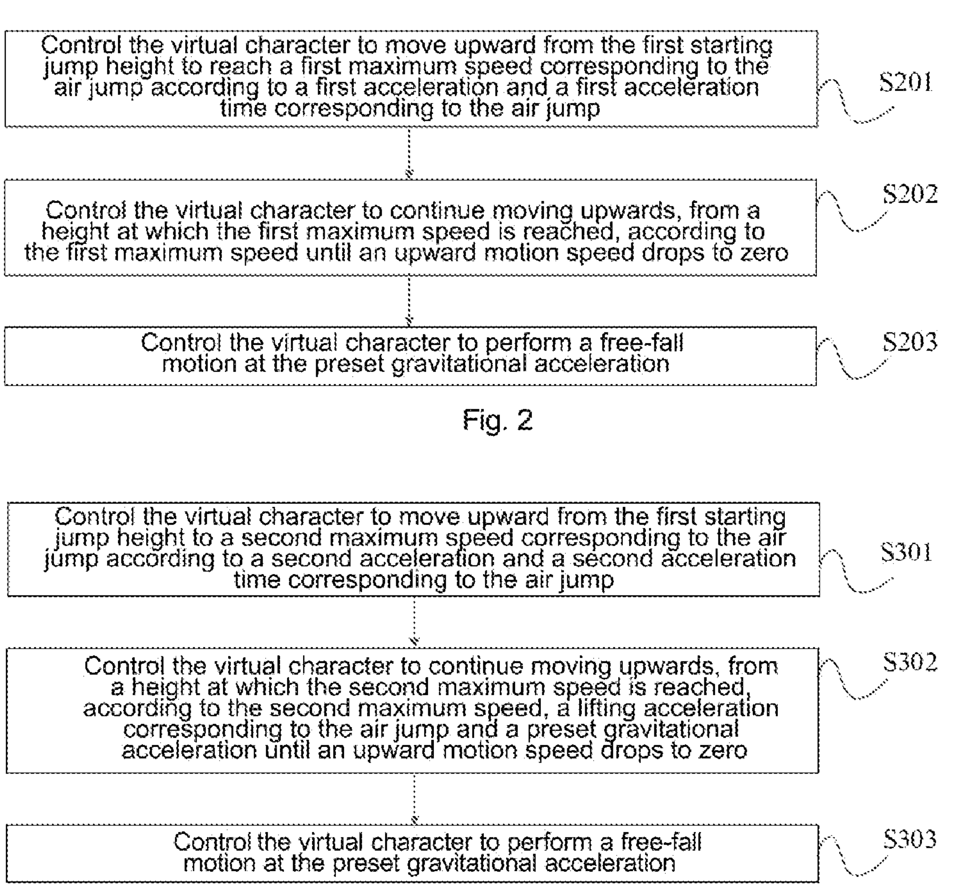
Fig. 2
Fig. 3

CHARACTER JUMP CONTROL METHOD AND APPARATUS IN GAME, TERMINAL DEVICE AND STORAGE MEDIUM

CROSS-REFERENCE TO RELATED APPLICATIONS

The present application is the U.S. national phase application of international application No. PCT/CN2022/100956, filed on Jun. 24, 2022, which is based upon and claims the priority to the Chinese patent application with the filing No. 202110834972.0 filed on Jul. 23, 2021, and entitled "Character Jump Control Method and Apparatus in Game, Terminal Device and Medium", the entire contents of both of which are incorporated herein by reference for all purposes.

TECHNICAL FIELD

The present disclosure relates to the technical field of human-computer interaction, in particular to a character jump control method and apparatus in a game, a terminal device and a non-transitory storage medium.

BACKGROUND ART

A character in a game may perform various movements, and the jump movement is one of the most basic mobile abilities of the character. The jump movement may include air jump, which refers to the jump initiated when the character is not on the ground, and the air jump has also become a hot research topic.

In the related technology, the air jump has one form, which is the repetition of the ground jump, that is, the movement of the air jump is similar to the movement of the ground jump, where the ground jump refers to the jump initiated when the character is on the ground.

However, in the related technology, the form of the air jump is relatively simple, which reduces the user experience.

SUMMARY

The present disclosure provides a character jump control method and apparatus in a game (a method and an apparatus for controlling a jump of a character in a game), a terminal device and a medium.

The present disclosure provides a character jump control method in a game, including: displaying, by a terminal device, a jump control in a graphical user interface, where the graphical user interface is provided by the terminal device and the graphical user interface includes a game scene with a virtual character; and during a free fall of the virtual character in performing a ground jump, in response to receiving a trigger operation for the jump control, controlling the virtual character to perform a jump operation corresponding to an air jump from a first starting jump height, where the first starting jump height is a current height of the virtual character in the game scene when the trigger operation is received, and the ground jump and the air jump are of jump types with different acceleration modes.

The second aspect of the present disclosure provides a terminal device, including a memory and a processor, where the memory stores a computer program executable by the processor, and the processor, when executing the computer program, implements the character jump control method in a game, including: displaying, by a terminal device, a jump control in a graphical user interface, where the graphical user interface is provided by the terminal device and the graphical user interface includes a game scene with a virtual character; and during a free fall of the virtual character in performing a ground jump, in response to receiving a trigger operation for the jump control, controlling the virtual character to perform a jump operation corresponding to an air jump from a first starting jump height, where the first starting jump height is a current height of the virtual character in the game scene when the trigger operation is received, and the ground jump and the air jump are of jump types with different acceleration modes.

The third aspect of the present disclosure provides a storage medium, where a computer program is stored on the storage medium, and the computer program, when read and executed, implements the character jump control method in a game, including: displaying, by a terminal device, a jump control in a graphical user interface, where the graphical user interface is provided by the terminal device and the graphical user interface includes a game scene with a virtual character; and during a free fall of the virtual character in performing a ground jump, in response to receiving a trigger operation for the jump control, controlling the virtual character to perform a jump operation corresponding to an air jump from a first starting jump height, where the first starting jump height is a current height of the virtual character in the game scene when the trigger operation is received, and the ground jump and the air jump are of jump types with different acceleration modes.

BRIEF DESCRIPTION OF DRAWINGS

In order to illustrate the technical solutions more clearly in embodiments of the present disclosure, the accompanying drawings which need to be used in the description of the embodiments will be briefly introduced below. It is to be understood that the accompanying drawings only show some embodiments of the present disclosure, so they shall not be regarded as limiting the scope. For a person ordinarily skilled in the art, other relevant drawings may be obtained in light of the accompanying drawings without any creative effort.

FIG. 1 is a flow chart of a character jump control method in a game provided by one of the embodiments of the present disclosure;

FIG. 2 is a flowchart of another character jump control method in a game provided by one of the embodiments of the present disclosure;

FIG. 3 is a flowchart of yet another character jump control method in a game provided by one of the embodiments of the present disclosure;

DETAILED DESCRIPTION

Figures 4, 5, 6:
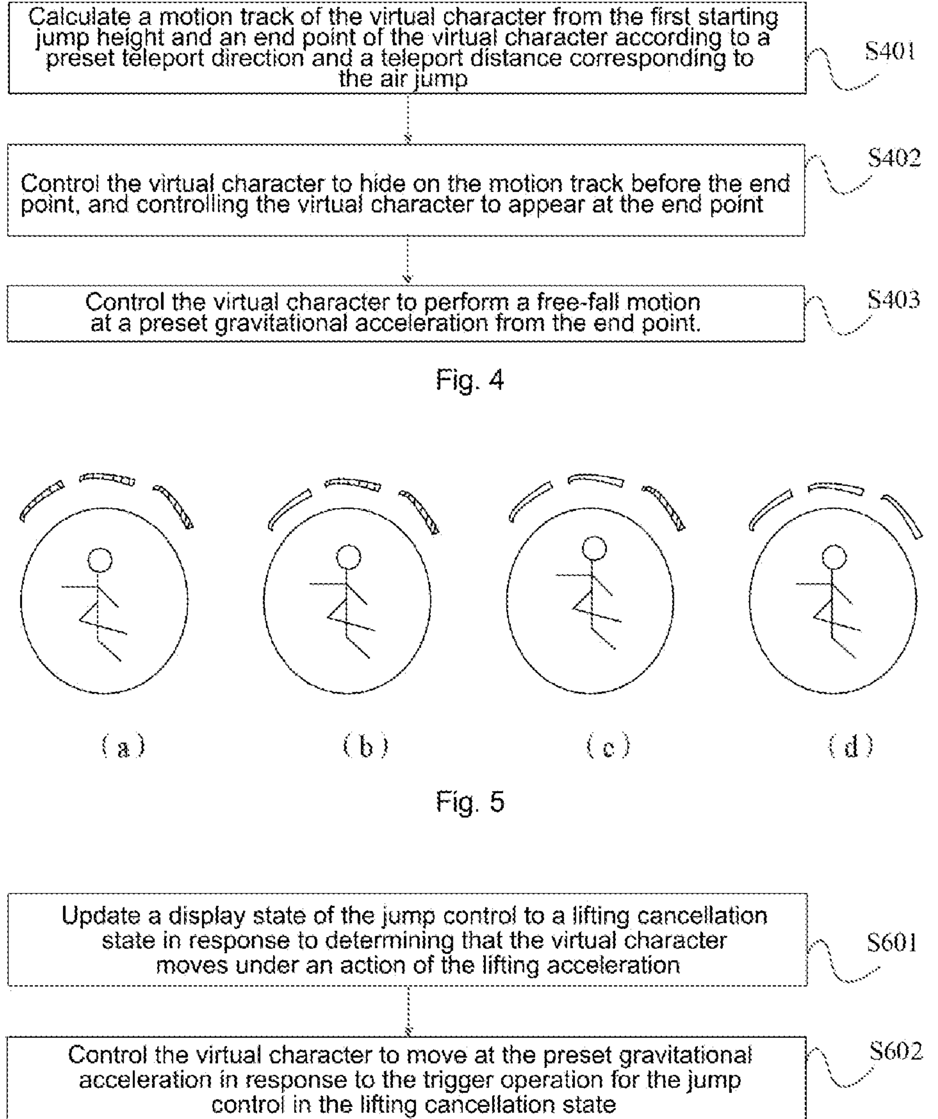
FIG. 4 is a flowchart of yet another character jump control method in a game provided by one of the embodiments of the present disclosure.
FIG. 5 is a schematic diagram of a display state of a jump control in a graphical user interface provided by one of the embodiments of the present disclosure.
FIG. 6 is a flowchart of yet another character jump control method in a game provided by one of the embodiments of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

In the description of the present disclosure, it should be noted that if the orientation or positional relationship indicated by the terms "up", "down", etc. is based on the orientation or positional relationship shown in the accompanying drawings or the orientation or positional relationship that the product of the present disclosure is generally placed when it is used, it is only for convenience of describing the present disclosure and simplifying the description, rather than indicating or implying that the referred apparatus or element must have a specific orientation, or be constructed and operated in a specific orientation, so it should not be understood as a limitation on the present disclosure.

In addition, the terms "first", "second", etc. in the specification and claims of the present disclosure and the accompanying drawings are intended to distinguish similar objects, but are not necessarily intended to describe a specific order or sequence. It should be understood that the data used in this way may be interchanged where appropriate, so that the embodiments of the present disclosure described herein can be implemented in a sequence other than those illustrated or described herein. In addition, the terms "include", "comprise" and "have" and any variations thereof are intended to cover non-exclusive inclusions. For example, a process, a method, a system, a product or a device that includes a series of steps or units is not necessarily limited to those steps or units that are clearly listed, but may include other steps or units that are not clearly listed or that are inherent to the process, the method, the product or the device.

It should be noted that the features in the embodiments of the present disclosure may be combined with each other if not conflicted.

In one of the embodiments of the present disclosure, the character jump control method in a game may be run on a local terminal device or a server. When the character jump control method in a game is run on the server, the method may be implemented and performed based on the cloud interaction system, where the cloud interaction system may include the server and a client device.

In an some examples according to the present disclosure, various cloud applications may be run under the cloud interaction system, such as cloud gaming. Taking the cloud gaming as an example, the cloud gaming refers to a game mode based on cloud computing. In the running mode of cloud gaming, the running subject of the game program and the presenting subject of game screen are separated, and the storage and running of the character jump control method in a game is completed on the cloud gaming server. The role of the client device is to receive and send data and present game screen. For example, the client device may be a display device with data transmission function and close to the user side, such as a mobile terminal, a TV, a computer, a PDA, etc. However, the terminal device for information processing is a cloud gaming server in the cloud. When playing a game, the player operates the client device to send an operation instruction to the cloud gaming server. The cloud gaming server, according to the operation instruction, runs the game encodes and compresses the data such as game screen, and returns them to the client device through the network, and finally, decodes and outputs the game screen through the client device.

In an example of the present disclosure, the terminal device may be a local terminal device. Taking the game as an example, the local terminal device stores the game program and is configured to present the game screen. The local terminal device is configured to interact with the player through the graphical user interface, that is, the game program is conventionally downloaded, installed and run through the electronic device. The local terminal device may provide the graphical user interface to the player in various ways, for example, it may be rendered and displayed on the display screen of the terminal, or it may be provided to the player through holographic projection. For example, the local terminal device may include a display screen for presenting a graphical user interface which includes a game screen, and a processor for running the game, generating the graphical user interface, and controlling the display of the graphical user interface on the display screen.

The embodiments of the present disclosure provide a character jump control method in a game, where a graphical user interface is provided through a terminal device, and the terminal device may be the aforementioned local terminal device or the aforementioned client device in the cloud interaction system, which is not specifically limited in the embodiments of the present disclosure.

The terminal device may provide a graphical user interface, which may include a game scene with a virtual character. The following takes the terminal device as the execution subject to illustrate and explain the character jump control method in a game provided by the embodiments of the present disclosure.

FIG. 1 is a flow diagram of a character jump control method in a game provided by the embodiments of the present disclosure. As shown in FIG. 1, the method may include:

S101: displaying a jump control in the graphical user interface.

The jump control may be a jump control corresponding to an air jump.

It should be noted that the jump control may always be displayed on the graphical user interface presented by the terminal device, or the terminal device may display the jump control on the graphical user interface during the ground jump performed by the virtual character, which is not specifically limited in the embodiments of the present disclosure.

S102: controlling the virtual character to perform a jump operation corresponding to the air jump from a first starting jump height in response to a received trigger operation for the jump control during a free fall of the ground jump performed by the virtual character.

The first starting jump height may be a current height of the virtual character in the game scene when the trigger operation is received, and the ground jump and the air jump are of jump types with different acceleration modes.

In some implementations, the virtual character performs a ground jump in response to the received ground jump trigger operation, and the ground jump may include a free fall process; during the free fall process of the ground jump performed by the virtual character, the virtual character is controlled to perform the jump operation corresponding to the air jump from the first starting jump height in response to receiving the trigger operation for the jump control.

In the embodiments of the present disclosure, the form of the ground jump may be a process in which the virtual character is controlled to accelerate upwards from the current foothold of the virtual character in the game scene, then is controlled by the gravitational acceleration to start decelerating, and then start a free fall of the ground jump after reaching the highest point. In the above, the current foothold of the virtual character in the game scene may be a virtual ground, a virtual step, a virtual mountain road, a virtual table, a virtual chair and other objects that may support the virtual character to stand and stay.

It should be noted that a ground jump control may be displayed on the graphical user interface, and the above ground jump trigger operation may be a trigger operation for the ground jump control; alternatively, the ground jump control may not be displayed on the graphical user interface, and the ground jump trigger operation may be a specific form of operation input in the graphical user interface, such as an upward sliding operation.

In accordance with the present disclosure, there are many air jump types, and different air jump types correspond to different forms of air jumps, all of which are different from the acceleration modes of ground jumps. The terminal device may control the virtual character to perform the jump operation corresponding to the target air jump type from the first starting jump height according to the currently configured target air jump type.

The embodiments of the present disclosure provide a character jump control method in a game, which includes: displaying a jump control in the graphical user interface; and controlling the virtual character to perform a jump operation corresponding to an air jump from a first starting jump height in response to a received trigger operation for the jump control during a free fall of a ground jump performed by the virtual character. In the above, the first starting jump height may be a current height of the virtual character in the game scene when the trigger operation is received, and the ground jump and the air jump are of jump types with different acceleration modes. The air jump is performed during the free fall of the ground jump performed by the virtual character The air jump is different from the ground jump in acceleration mode, and there is obvious difference between the air jump and the ground jump, which makes the forms of air jumps richer and improves the user experience.

In some examples, the air jump is of any one of the following jump types: a catapult jump type, a smooth jump type, a floating jump type and a teleport jump type.

It should be noted that, during playing the game, the player may switch among four types of air jumps, such as the catapult jump type, the smooth jump type, the floating jump type and the teleport jump type, at any time according to actual needs.

For example, a switch control may be displayed on the graphical user interface, and the air jump type may be switched in response to the trigger operation of the switch control.

The terminal device may also switch from the user graphical interface to the configuration interface to reconfigure the air jump type, which is not specifically limited in the embodiments of the present disclosure.

FIG. 2 is a flow chart of another character jump control method in a game provided by the embodiments of the present disclosure. As shown in FIG. 2, if the air jump is of the catapult jump type, the process of controlling the virtual character to perform a jump operation corresponding to an air jump from a first starting jump height in S102 may include:

S201: controlling the virtual character to move upward from the first starting jump height to reach a first maximum speed corresponding to the air jump according to a first acceleration and a first acceleration time corresponding to the air jump.

In the above, the first acceleration is the upward acceleration, and the first maximum speed is equal to the first acceleration multiplied by the first acceleration time.

S202: controlling the virtual character to continue moving upwards, from a height at which the first maximum speed is reached, according to the first maximum speed until an upward motion speed drops to zero.

It should be noted that after the virtual character reaches the first maximum speed, the first acceleration no longer acts. Under the action of gravitational acceleration, the terminal device controls the virtual character to continue decelerating upward with the first maximum speed as the initial speed until the upward motion speed of the virtual character drops to zero and the virtual character reaches the highest point of the air jump.

S203: controlling the virtual character to perform a free-fall motion at the preset gravitational acceleration.

In the above, the directions of the first acceleration and the preset gravitational acceleration are opposite, and a value of the first acceleration is greater than a value of the preset gravitational acceleration.

In addition, the terminal device may control the virtual character to perform a free-fall motion from the highest point of the above-mentioned air jump at a preset gravitational acceleration.

In the embodiments of the present disclosure, the first acceleration and the first acceleration time corresponding to the catapult jump type are different from the upward acceleration and the acceleration time corresponding to the ground jump.

It should be noted that the first acceleration and the first acceleration time may be set according to actual needs. For example, the first acceleration may be 38 meters per square second, and the first acceleration time may be 0.17 seconds.

The gravitational acceleration may be −12.8 meters per square second, and the first maximum speed may be 6.46 meters per second. In addition, the maximum height of single jump may be set to 1.91 meters, the lifting height of the air jump may be set to 2.18 meters, and the comprehensive maximum height may be set to 6.27 meters.

FIG. 3 is a flowchart of yet another character jump control method in a game provided by the embodiments of the present disclosure. As shown in FIG. 3, if the air jump is of the smooth jump type or a floating jump type, the step of controlling the virtual character to perform a jump operation corresponding to an air jump from a first starting jump height in S102 includes:

S301: controlling the virtual character to move upward from the first starting jump height to a second maximum speed corresponding to the air jump according to a second acceleration and a second acceleration time corresponding to the air jump.

In the above, the second maximum speed is equal to the second acceleration multiplied by the second acceleration time.

It should be noted that, according to the second acceleration and the second acceleration time corresponding to the air jump, the terminal device controls the virtual character to accelerate upward from the first starting jump height and reach the second maximum speed corresponding to the air jump.

S302: controlling the virtual character to continue moving upwards, from a height at which the second maximum speed is reached, according to the second maximum speed, a lifting acceleration corresponding to the air jump and a preset gravitational acceleration until an upward motion speed drops to zero.

In the above, the lifting acceleration and the second acceleration are upward accelerations, and the preset gravitational acceleration is a downward acceleration.

In some implementations, the terminal device controls the virtual character to slowly decelerates upward, starting from the height at which the second maximum speed is reached, and under the action of the lifting acceleration corresponding to the air jump and the preset gravitational acceleration, with the second maximum speed as the initial speed, until the upward motion speed drops to zero and the highest point of the air jump is reached.

S303: controlling the virtual character to perform a free-fall motion at the preset gravitational acceleration.

In some implementations, the terminal device controls the virtual character to perform a free-fall motion from the highest point of the above-mentioned air jump at the preset gravitational acceleration.

In the above, the direction of the second acceleration is opposite to the preset gravitational acceleration, and the value of the second acceleration is greater than the value of the preset gravitational acceleration; the direction of the lifting acceleration is the same as the direction of the second acceleration, and the value of the lifting acceleration is smaller than the value of the preset gravitational acceleration. The gravitational acceleration corresponding to the smooth jump type is greater than the gravitational acceleration corresponding to the floating jump type.

In addition, the value of the second acceleration corresponding to the smooth jump type is greater than the value of the second acceleration corresponding to the floating jump type; the second acceleration time corresponding to the smooth jump type is smaller than the second acceleration time corresponding to the floating jump type; and the second maximum speed corresponding to the smooth jump type is greater than the second maximum speed corresponding to the floating jump type. In the above S301, the smooth jump type may reach a stable speed state with a relatively long duration but a low acceleration, and the floating jump type may reach a low speed state through a low acceleration.

It should be noted that the value of the lifting acceleration corresponding to the smooth jump type is smaller than the lifting acceleration corresponding to the floating jump type. The smaller the value of the lifting acceleration is, the greater the overall downward acceleration is, and when the second maximum speed is taken as the initial speed, the faster the deceleration is. Similarly, the greater the value of the lifting acceleration is, the smaller the overall downward acceleration is, and when the second maximum speed is taken as the initial speed, the slower the deceleration is.

In the embodiments of the present disclosure, the parameters such as the second acceleration, the second acceleration time, the lifting acceleration and the preset gravitational acceleration may be set according to the actual needs. In addition, parameters such as the maximum height of single jump, the height of the air jump and the comprehensive maximum height may also be set.

For example, for a smooth jump type, the second acceleration time may be 0.18 seconds, the second acceleration may be 28 meters per square second, the lifting acceleration may be 9.7 meters per square second, the gravitational acceleration may be −3.1 meters per square second, the second maximum speed may be 5.04 meters per second, the height of the air jump may be 4.55 meters, the comprehensive maximum height may be 6.46 meters, and the maximum height of single jump may be 1.91 meters.

For example, for the floating jump type, the second acceleration time may be 0.21 seconds, the second acceleration may be 20 meters per square second, the lifting acceleration may be 10.4 meters per square second, the gravitational acceleration may be −2.4 meters per square second, the second maximum speed may be 4.2 meters per second, the height of the air jump may be 4.12 meters, the comprehensive maximum height may be 6.03 meters, and the maximum height of single jump may be 1.91 meters.

FIG. 4 is a flow chart of yet another character jump control method in a game provided by the embodiments of the present disclosure. As shown in FIG. 4, if the air jump is of the teleport jump type, the process of controlling the virtual character to perform a jump operation corresponding to an air jump from a first starting jump height in S102 may include:

S401: calculating a motion track of the virtual character from the first starting jump height and an end point according to a preset teleport direction and a teleport distance corresponding to the air jump.

In the above, the preset teleport direction may be the motion direction of the virtual character or the direction of the virtual camera in the game.

In some implementations, the terminal device may determine the current position of the virtual character, and by taking the current position of the virtual character as the start point and using preset planning rules according to the start point, the teleport direction and the teleport distance, determine the motion track of the virtual character from the first starting jump height and the end point.

For example, the motion track between the start point and the end point may be a straight line, and the length of the straight line may be the teleport distance.

S402: controlling the virtual character to hide on the motion track before the end point, and controlling the virtual character to appear at the end point.

In some implementations, the terminal device may control the virtual character to move along the motion track, and hide the virtual character before reaching the terminal. The special effects may also be displayed during the motion of the virtual character along the motion track, and the display of the virtual character may be controlled after the virtual character arrives at the terminal.

In the above, after the virtual character reaches the end point, the virtual character may gradually appear, or may totally appear directly, or the virtual character may be displayed in other ways, which is not specifically limited in the embodiments of the present disclosure.

In some examples, the terminal device may control the virtual character to teleport along the motion track in the teleport time corresponding to the air jump.

S403: controlling the virtual character to perform a free-fall motion at a preset gravitational acceleration from the end point.

It should be noted that in the game scene, when the virtual character encounters a virtual barrier, the virtual character may perform the air jump of the teleport jump type to avoid the virtual barrier and realize the teleport, and the overall completion speed is relatively fast.

In the embodiments of the present disclosure, the teleport distance and the teleport time may be set according to actual needs or empirical values, and the maximum height of a single jump and the comprehensive maximum height may also be set. For example, the teleport distance may be 4.5 meters, the teleport time may be 0.3 seconds, the maximum height of a single jump may be 1.91 meters, and the comprehensive maximum height may be 6.41 meters.

In some examples, the method may further include steps of:

controlling the virtual character to perform the jump operation corresponding to the air jump again from a second starting jump height in response to a received re-triggering operation for the jump control during the free fall of the air jump performed by the virtual character.

In the above, the second starting jump height is the current height of the virtual character in the game scene when the re-triggering operation is received.

It should be noted that, when the air jump is of the catapult jump type or the teleport jump type, the virtual character will perform the jump operation corresponding to the air jump again from the second starting jump height, which is similar to the jump operation corresponding to the air jump performed by the virtual character from the first starting jump height, and will not be repeated here.

In some examples, the method may further include:

updating a display mode of the jump control to indicate a remaining number of jumps of the air jump according to a number of jumps of the air jump performed by the virtual character.

In the above, the jump control has the corresponding preset number of jumps. Every time the virtual character performs one air jump, the preset number of jumps are reduced by 1, and the remaining number of jumps of the air jump may be displayed on the jump control.

In some examples, the method may further include:

updating the jump control to a non-interactive state if the remaining number of jumps is zero.

It should be noted that when the jump control is in the non-interactive state, if the trigger operation for the jump control is received, the virtual character is not controlled to perform the air jump.

FIG. 5 is a schematic diagram of the display state of a jump control in a graphical user interface provided by the embodiments of the present disclosure. As shown in FIG. 5 (*a*), the preset number of jumps may be 3, and the remaining number of jumps of the air jump may also be 3. After the virtual character performs one air jump, as shown in FIG. 5 (*b*), the remaining number of jumps of the air jump may be 2. After the virtual character performs two air jumps, as shown in FIG. 5 (*c*), the remaining number of jumps of the air jump may be 1. After the virtual character performs three air jumps, as shown in FIG. 5 (*d*), the remaining number of jumps of the air jump may be 0, and the jump control is in a non-interactive state.

The preset number of jumps may also be 4 or 2, and it may also be set according to actual needs, which is not specifically limited in the embodiments of the present disclosure.

In some examples, the catapult jump type and the teleport jump type may be implemented in the form of numbers type interaction.

In some examples, if the air jump is of the floating jump type, before the process of controlling the virtual character to perform a free-fall motion at the preset gravitational acceleration in S303, the method may further include: controlling the virtual character to move downwards under an action of the lifting acceleration and the preset gravitational acceleration until an energy of the virtual character is exhausted.

In the above, for the floating jump type, the virtual character may have a preset energy, and the preset energy of the virtual character needs to be consumed when the second acceleration and the lifting acceleration act.

It should be noted that when the virtual character moves downwards under the action of the lifting acceleration and the preset gravitational acceleration, the direction of the lifting acceleration is opposite to the direction of the gravitational acceleration. Therefore, compared with the case that the virtual character moves downwards only under the action of the preset gravitational acceleration, the descending speed of the virtual character is slower, thus realizing the slow descent of the virtual character.

In addition, after the energy of the virtual character is exhausted, the virtual character will perform a free-fall motion under the action of the preset gravitational acceleration. During the free fall, the energy may be recovered.

In some examples, in the above S303, if the air jump is of the smooth jump type, before the process of controlling the virtual character to perform a free-fall motion at the preset gravitational acceleration, the method may further include:

controlling the virtual character to suspend at a height at which the upward motion speed drops to zero until an energy of the virtual character is exhausted.

In the above, for the smooth jump type, the virtual character may have a preset energy, and the energy needs to be consumed under the action of the second acceleration; and the energy also needs to be consumed during suspension at a corresponding height at which the upward motion speed drops to zero.

In some examples, the virtual character is controlled to recover energy during falling.

Similarly, for the smooth jump type, after the energy is exhausted, from the corresponding height at which the upward motion speed dropping to zero, the free-fall motion is performed under the action of the preset gravitational acceleration, and the energy may be recovered during the free fall.

In some examples, FIG. 6 is a flow chart of yet another character jump control method in a game provided by the embodiments of the present disclosure. As shown in FIG. 6, the method may further include:

S601: updating a display state of the jump control to a lifting cancellation state if the virtual character moves under an action of the lifting acceleration.

In some implementations, for both the smooth jump type and the floating jump type, when the virtual character slowly decelerates upward under the action of the lifting acceleration and the gravitational acceleration, the display state of the jump control may be updated to the lifting cancellation state.

Figures 7, 8, 9, 10:
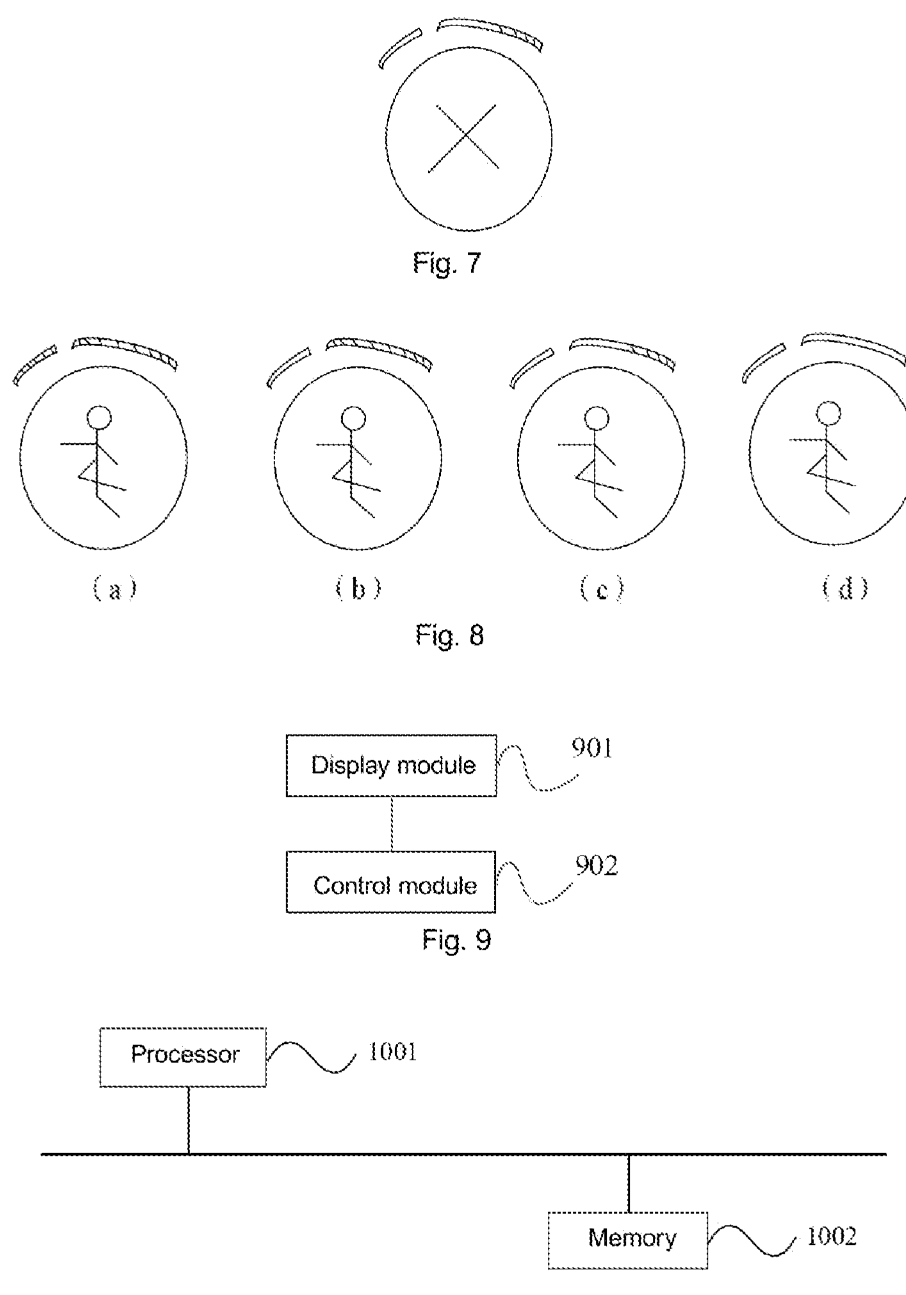
FIG. 7 is a schematic display diagram of a jump control in a lifting cancellation state provided by one of the embodiments of the present disclosure.
FIG. 8 is a schematic diagram of a display state of a jump control in a graphical user interface provided by one of the embodiments of the present disclosure.
FIG. 9 is a structural schematic diagram of a character jump control apparatus in a game provided by one of the embodiments of the present disclosure.
FIG. 10 is a structural schematic diagram of a terminal device provided by one of the embodiments of the present disclosure.

FIG. 7 is a schematic display diagram of a jump control in a lifting cancellation state provided by the embodiments of the present disclosure. As shown in FIG. 7, the jump control is in the lifting cancellation state.

S602: controlling the virtual character to move at the preset gravitational acceleration in response to the trigger operation for the jump control in the lifting cancellation state.

In the above, the terminal device responds to the trigger operation for the jump control in the lifting cancellation state, and updates the display state of the jump control according to the current energy of the virtual character.

In the embodiments of the present disclosure, the terminal device responds to the trigger operation for the jump control in the lifting cancellation state, cancels the action of lifting acceleration, and controls the virtual character to move at the preset gravitational acceleration.

In some examples, if the air jump is of the smooth jump type, the method may further include:

controlling the virtual character to perform the jump operation corresponding to the air jump again from the second starting jump height in response to receiving a re-triggering operation for the jump control during the free fall of the air jump performed by the virtual character, where the second starting jump height is the current height of the virtual character in the game scene when the re-triggering operation is received.

In some implementations, during the free fall of the air jump performed by the virtual character, in response to receiving the re-triggering operation for the jump control, the virtual character is controlled to accelerate upward to the second maximum speed, from the second starting jump height, under the action of the second acceleration and the second acceleration time corresponding to the smooth jump type; then, according to the second maximum speed, the lifting acceleration and the preset gravitational acceleration corresponding to the smooth jump type, the virtual character is controlled to continue decelerating upward until the upward motion speed drops to zero; the virtual character is suspended at the corresponding height at which the upward motion speed drops to zero until the energy is exhausted, and the virtual character is controlled to perform a free-fall motion under the action of gravitational acceleration.

In some examples, if the air jump is of the floating jump type, the method further includes:

controlling the virtual character to float downward, from the second starting jump height, under the action of the lifting acceleration and the preset gravitational acceleration time in response to receiving the re-triggering operation for the jump control during the free fall of the air jump performed by the virtual character, where the second starting jump height is the current height of the virtual character in the game scene when the re-triggering operation is received.

In some implementations, the virtual character is controlled to float downward from the second starting jump height under the action of the lifting acceleration and the preset gravitational acceleration. After the energy is exhausted, the virtual character is controlled to perform a free-fall motion under the action of the preset gravitational acceleration.

In some examples, the method may further include:

updating a display mode of the jump control to indicate a remaining energy of the air jump according to the consumed energy and recovered energy of the virtual character in performing the air jump.

The energy may be consumed under the action of the second acceleration and the lifting acceleration, and the energy may be recovered during the free fall.

In some examples, the method further includes:

updating the jump control to a non-interactive state if a remaining energy of the virtual character is zero.

It should be noted that the smooth jump type and the floating jump type may adopt the energy type interactions. The floating jump type may also adopt the numbers type interaction. For example, after each air jump, the sustained floating ability may be obtained after accelerating upwards, and the floating duration may be fixed, or it may be sustained until reaches the highest point or lands.

In the embodiments of the present disclosure, each type of air jump may be set and combined according to the following details to derive more branch features, and the specific implementation mode is as follows.

Whether it may accelerate the horizontal motion: the air jump may accelerate the horizontal motion to achieve the effect of speeding up for travel. Function realization: during the upward acceleration, the speed in the current horizontal direction is accelerated for the same duration, which can achieve the effect of sprinting in the current direction quickly during the air jump.

Whether it has suspension ability: for example, the smooth jump type supports the highest point suspension, but this function may also be attached to other jump types. Function realization: when moving upwards until the vertical speed is close to 0, the suspension effect is triggered, so that the user keeps the vertical speed at 0 for a period of time, but can move horizontally. This function will be of great help for air shooting.

Number of jumps or energy consumption: it is the difference between the numbers type jump and the energy type jump. Function realization: resources, i.e., the numbers or the energy may be selected for the air jump.

Horizontal motion ability in the air: the ascending period, the suspending period and the descending period are included. Function realization: different horizontal motion abilities are set for different air jumps, for example, the horizontal motion ability of the catapult jump type is weaker than the horizontal motion ability of the floating jump type. Jumps with strong horizontal motion ability can be used for speeding up the travel, but in order to balance, it will generally be weakened in other aspects, such as the jump height (i.e., the ability to accelerate upwards). The horizontal motion ability may also be distinguished for the ascending period, the suspending period and the descending period of the jump.

In the embodiments of the present disclosure, each type of air jump may also be supplemented with some detailed jump operations, and the specific implementation mode is as follows.

According to the vertical speed of the air takeoff, it is decided what kind of jump feedback to adopt. For example, when the virtual character falls, the air jump will only provide an upward lifting acceleration, but will not lead to an upward motion. This allows the virtual character to no longer trigger the ascent when falling, but may slowly fall by operation. Achieved effect: when the virtual character is in the air, it can be controlled whether to ascend by selecting the time point to jump again. For example, in the ascending stage after the virtual character jumps into the air from the ground, it can accelerate upwards by clicking the air jump, but in the descending stage, the falling is buffered instead of jumping upwards. A selection may be made between the two jump feelings.

Whether to inherit the vertical speed when taking off, how much proportion to inherit or whether there is an inheritance upper limit: this setting can directly affect the inertia feeling of the player during the air jump. Achieved effect: when inheriting the vertical speed, the difference between the jump results caused by jumping at different time points are greater, and the inertia is stronger. When there is no inheritance or less inheritance, the feeling of switching is stronger, and the player's expectation for the jump results is more stable.

Press-down operation duration during takeoff: the overall level of the upward acceleration obtained by the air jump is affected according to the press-down duration. Achieved effect: for example, according to the press-down operation duration of the jump control, the time of upward acceleration is increased correspondingly. When the player releases the jump control within 0.2 seconds after pressing down the jump control, the jump acceleration duration is 0.17 seconds. When the jump control is pressed for more than 0.2 seconds, each time the player presses for a longer period of time, the jump acceleration time is increased correspondingly, and the maximum acceleration time is 0.34 seconds.

Different times of air jumps are designed separately: for example, the second, the third and the fourth air jump may be designed separately. Achieved effect: if the first air jump and the second air jump have different effects, the first air jump will have strong acceleration and strong lifting, and will trigger suspension. In the second air jump, there is no strong upward acceleration, but only sustained upward lifting, and suspension will not be triggered. In this way, when the player wants to get the effect of the second air jump, he can trigger the second air jump in advance by canceling the sustained lifting of the first air jump.

FIG. 8 is a schematic diagram of the display state of a jump control in a graphical user interface provided by the embodiments of the present disclosure, as shown in (a), (b), (c) and (d) in FIG. 8, which are schematic diagrams of the energy reduction process of the virtual character.

In some implementations, when the jump control is in a non-interactive state, the color of the jump control may change, for example, the jump control may be displayed in red.

The movement of different types of air jumps will be described in the following.

Catapult jump type: The operations for 5 directions (vertical, front, back, left and right) have independent movements respectively, and the effect is crisp. When the virtual character takes off, if the horizontal speed is smaller than the preset speed threshold (for example, the preset speed threshold may be 0.1 meter per second), the vertical jump movement may be used; otherwise, the corresponding movement may be selected according to the current operation direction. Once the movement is selected, it will not change until the end of the jump.

It should be noted that the terrain in the game scene is very complicated, and the virtual character does not just jump on the flat ground. When the virtual character jumps from platforms at different heights to the ground, if the jump movement is just played at a fixed rate, it is likely that the play will finish before the virtual character lands, and it will be fixed at the last frame of the movement in the following falling process, which will make the movement of the virtual character very stiff. Therefore, in the falling process of the virtual character, the current height of the virtual character from the ground can be detected in real time, and the animation playing rate can be dynamically adjusted, so that the play of the whole movement of the virtual character can finish while landing.

In the above, the movement playing rate=Min (the remaining time of animation+the time required for landing, 1).

$$\text{Remaining time before landing} = \frac{-\text{Falling speed} + \sqrt{\text{Falling speed}^2 - 2 * \text{Graviational acceleration} * \text{Height from the ground}}}{\text{Gravitational acceleration}},$$

where the falling speed is smaller than or equal to 0.

Smooth jump type and floating jump type: Due to the emphasis on the staying in the air, the mixed frame animation technology is used during the virtual character floating in the air. The skeletal animation used is not a single animation played continuously, and each key frame of the movement resource represents the maximum tilt posture of the virtual character in a certain direction. When the virtual character stays in the air, different postures with different orientations and tilts can be obtained by fusing multiple key frames according to the current horizontal motion direction and speed.

The following describes the character jump control apparatus, the terminal device and the storage medium in a game for performing the character jump control method in a game provided by the present disclosure. For the specific implementation process and technical effects, please refer to the above related contents of the character jump control method in a game, which will not be described below.

FIG. 9 is a structural schematic diagram of a character jump control apparatus in a game provided by the embodiments of the present disclosure. As shown in FIG. 9, the device may include:

- a display module 901, configured to display a jump control in the graphical user interface; and
- a control module 902, configured to control the virtual character to perform a jump operation corresponding to an air jump from a first starting jump height in response to a received trigger operation for the jump control during a free fall of the virtual character in performing a ground jump, where the first starting jump height is a current height of the virtual character in the game scene when the trigger operation is received, and the ground jump and the air jump are jump types with different acceleration modes.

In some examples, the air jump is of any one of the following jump types: a catapult jump type, a smooth jump type, a floating jump type and a teleport jump type.

In some examples, if the air jump is of the catapult jump type, the control module 902 is configured to control the virtual character to move upward from the first starting jump height to reach a first maximum speed corresponding to the air jump according to a first acceleration and a first acceleration time corresponding to the air jump; control the virtual character to continue moving upwards from a height at which the first maximum speed is reached according to the first maximum speed until an upward motion speed drops to zero; and control the virtual character to perform a free-fall motion with a preset gravitational acceleration; where directions of the first acceleration and the preset gravitational acceleration are opposite, and a value of the first acceleration is greater than a value of the preset gravitational acceleration.

In some examples, if the air jump is of the smooth jump type or the floating jump type, the control module 902 is configured to control the virtual character to move upward from the first starting jump height to a second maximum speed corresponding to the air jump according to a second acceleration and a second acceleration time corresponding to the air jump; control the virtual character to continue moving upwards, from a height at which the second maximum speed is reached, according to the second maximum speed, a lifting acceleration corresponding to the air jump and a preset gravitational acceleration until an upward motion speed drops to zero; and control the virtual character to perform a free-fall motion at the preset gravitational acceleration; where directions of the second acceleration and the preset gravitational acceleration are opposite, a value of the second acceleration is greater than a value of the preset gravitational acceleration, a direction of the lifting acceleration and a direction of the second acceleration are the same, and a value of the lifting acceleration is smaller than the value of the preset gravitational acceleration; and the value of the second acceleration corresponding to the smooth jump type is greater than the value of the second acceleration corresponding to the floating jump type, and the value of the lifting acceleration corresponding to the smooth jump type is smaller than the value of the lifting acceleration corresponding to the floating jump type.

In some examples, if the air jump is of the teleport jump type, the control module 902 is configured to calculate a motion track of the virtual character from the first starting jump height and an end point according to a preset teleport direction and a teleport distance corresponding to the air jump; control the virtual character to hide on the motion track before the end point, and control the virtual character to appear at the end point; and control the virtual character to perform a free-fall motion at a preset gravitational acceleration from the end point.

In some examples, the device further includes:

a first control module, configured to control the virtual character to perform the jump operation corresponding to the air jump again from a second starting jump height in response to a received re-triggering operation for the jump control during the free fall of the virtual character in performing the air jump, where the second starting jump height is the current height of the virtual character in the game scene when the re-triggering operation is received.

In some examples, the device further includes:

a first update module, configured to update a display mode of the jump control to indicate a remaining number of jumps of the air jump according to a number of jumps of the virtual character in performing the air jump.

In some examples, the device further includes:

a second update module, configured to update the jump control to a non-interactive state if the remaining number of jumps is zero.

In some examples, the device further includes:

a second control module, configured to control the virtual character to move downwards under an action of the lifting acceleration and the preset gravitational acceleration until an energy of the virtual character is exhausted.

In some examples, the device further includes:

a third control module, configured to control the virtual character to suspend at a corresponding height at which the upward motion speed drops to zero until an energy of the virtual character is exhausted.

In some examples, the device further includes:

a third update module, configured to update a display state of the jump control to a lifting cancellation state if the virtual character moves under an action of the lifting acceleration; and a fourth control module, configured to control the virtual character to move at the preset gravitational acceleration in response to the trigger operation for the jump control in the lifting cancellation state.

In some examples, the device further includes:

a fifth control module, configured to control the virtual character to recover the energy during falling.

In some examples, if the air jump is of the smooth jump type, the device further includes:

a sixth control module, configured to control the virtual character to perform the jump operation corresponding to the air jump again from the second starting jump height in response to a received re-triggering operation for the jump control during the free fall of the virtual character in performing the air jump; where the second starting jump height is the current height of the virtual character in the game scene when the re-triggering operation is received.

In some examples, if the air jump is of the floating jump type, the device further includes:

a seventh control module, configured to control the virtual character to float downward from the second starting jump height under the action of the lifting acceleration and the preset gravitational acceleration in response to receiving the re-triggering operation for the jump control during the free fall of the virtual character in performing the air jump, where the second starting jump height is the current height of the virtual character in the game scene when the re-triggering operation is received.

In some examples, the device further includes:

a fourth update module, configured to update a display mode of the jump control to indicate a remaining energy of the air jump according to the consumed energy and recovered energy of the virtual character in performing the air jump.

In some examples, the device further includes:

a fifth update module, configured to update the jump control to a non-interactive state if a remaining energy of the virtual character is zero.

The implementation principle and technical effect of the above device for performing the method provided by the aforementioned embodiments are similar, and will not be repeated here.

The above modules may be one or more integrated circuits configured to implement the above method, such as one or more Application Specific Integrated Circuits (ASIC), one or more Digital Signal Processors (DSP), or one or more Field Programmable Gate Arrays (FPGA), etc. For example, when one of the above modules is implemented in the form of calling program codes by a processing element, the processing element may be a general-purpose processor, such as a Central Processing Unit (CPU) or other processors that can call the program codes. For another example, these modules may be integrated together and implemented in the form of system-on-a-chip (SOC).

FIG. 10 is a structural schematic diagram of a terminal device provided by the embodiments of the present disclosure. As shown in FIG. 10, the terminal device includes a processor 1001 and a memory 1002.

The memory 1002 is configured to store a program, and the processor 1001 calls the program stored in the memory 1002 to execute the steps of the above character jump control method in a game.

For example, the steps of the above character jump control method in a game may include:

displaying a jump control in the graphical user interface; and controlling the virtual character to perform a jump operation corresponding to an air jump from a first starting jump height in response to a received trigger operation for the jump control during a free fall of the virtual character in performing a ground jump, where the first starting jump height is a current height of the virtual character in the game scene when the trigger operation is received, and the ground jump and the air jump are of jump types with different acceleration modes.

In some examples, the air jump is of any one of the following jump types: a catapult jump type, a smooth jump type, a floating jump type and a teleport jump type.

In some examples, if the air jump is of the catapult jump type, the step of controlling the virtual character to perform a jump operation corresponding to an air jump from a first starting jump height includes:

controlling the virtual character to move upward from the first starting jump height to reach a first maximum speed corresponding to the air jump according to a first acceleration and a first acceleration time corresponding to the air jump;

controlling the virtual character to continue moving upwards from a height at which the first maximum speed is reached according to the first maximum speed until an upward motion speed drops to zero; and controlling the virtual character to perform a free-fall motion with a preset gravitational acceleration, where directions of the first acceleration and the preset gravitational acceleration are opposite, and a value of the first acceleration is greater than a value of the preset gravitational acceleration.

In some examples, if the air jump is of the smooth jump type or the floating jump type, the step of controlling the virtual character to perform a jump operation corresponding to an air jump from a first starting jump height includes:

controlling the virtual character to move upward from the first starting jump height to a second maximum speed corresponding to the air jump according to a second acceleration and a second acceleration time corresponding to the air jump;

controlling the virtual character to continue moving upwards, from a height at which the second maximum speed is reached, according to the second maximum speed, a lifting acceleration corresponding to the air jump and a preset gravitational acceleration until an upward motion speed drops to zero; and controlling the virtual character to perform a free-fall motion at the preset gravitational acceleration, where directions of the second acceleration and the preset gravitational acceleration are opposite, a value of the second acceleration is greater than a value of the preset gravitational acceleration, a direction of the lifting acceleration and a direction of the second acceleration are the same, and a value of the lifting acceleration is smaller than the value of the preset gravitational acceleration; and the value of the second acceleration corresponding to the smooth jump type is greater than the value of the second acceleration corresponding to the floating jump type, and the value of the lifting acceleration corresponding to the smooth jump type is smaller than the value of the lifting acceleration corresponding to the floating jump type.

In some examples, if the air jump is of the teleport jump type, the step of controlling the virtual character to perform a jump operation corresponding to an air jump from a first starting jump height includes:

calculating a motion track of the virtual character from the first starting jump height and an end point according to a preset teleport direction and a teleport distance corresponding to the air jump;

controlling the virtual character to hide on the motion track before the end point, and controlling the virtual character to appear at the end point; and controlling the virtual character to perform a free-fall motion at the preset gravitational acceleration from the end point.

In some examples, the method further includes:

controlling the virtual character to perform the jump operation corresponding to the air jump again from a second starting jump height in response to a received re-triggering operation for the jump control during the free fall of the virtual character in performing the air jump, where the second starting jump height is the current height of the virtual character in the game scene when the re-triggering operation is received.

In some examples, the method further includes:

updating a display mode of the jump control to indicate a remaining number of jumps of the air jump according to a number of jumps of the air jump performed by the virtual character.

In some examples, the method further includes:

updating the jump control to a non-interactive state if the remaining number of jumps is zero.

In some examples, if the air jump is of the floating jump type, before the step of controlling the virtual character to perform a free-fall motion at the preset gravitational acceleration, the method further includes:

controlling the virtual character to move downwards under an action of the lifting acceleration and the preset gravitational acceleration until an energy of the virtual character is exhausted.

In some examples, if the air jump is of the smooth jump type, before the step of controlling the virtual character to perform a free-fall motion at the preset gravitational acceleration, the method further includes:

controlling the virtual character to suspend at a height at which the upward motion speed drops to zero until an energy of the virtual character is exhausted.

In some examples, the method further includes:

updating a display state of the jump control to a lifting cancellation state if the virtual character moves under an action of the lifting acceleration; and controlling the virtual character to move at the preset gravitational acceleration in response to the trigger operation for the jump control in the lifting cancellation state.

In some examples, the method further includes:

controlling the virtual character to recover an energy during falling.

In some examples, if the air jump is of the smooth jump type, the method further includes:

controlling the virtual character to perform the jump operation corresponding to the air jump again from the second starting jump height in response to a received re-triggering operation for the jump control during the free fall of the virtual character in performing the air jump, where the second starting jump height is the current height of the virtual character in the game scene when the re-triggering operation is received.

In some examples, if the air jump is of the floating jump type, the method further includes:

controlling the virtual character to float downward from the second starting jump height under the action of the lifting acceleration and the preset gravitational acceleration in response to receiving the re-triggering operation for the jump control during the free fall of the virtual character in performing the air jump, where the second starting jump height is the current height of the virtual character in the game scene when the re-triggering operation is received.

In some examples, the method further includes:

updating a display mode of the jump control to indicate a remaining energy of the air jump according to the consumed energy and recovered energy of the virtual character in performing the air jump.

In some examples, the method further includes:

updating the jump control to a non-interactive state if a remaining energy of the virtual character is zero.

In the above manner, by displaying a jump control in the graphical user interface, the virtual character is controlled to perform a jump operation corresponding to an air jump from a first starting jump height in response to a received trigger operation for the jump control during a free fall of the virtual character in performing a ground jump, where the first starting jump height may be a current height of the virtual character in the game scene when the trigger operation is received, and the ground jump and the air jump are of jump types with different acceleration modes. The air jump is performed during the free fall of the ground jump by the virtual character. The air jump is different from the ground jump in acceleration mode, and there is obvious difference between the air jump and the ground jump, which makes the forms of air jumps richer and improves the user experience.

In some examples, the present disclosure also provides a program product, such as a non-transitory computer-readable storage medium, where the program product includes a program, and the program, when executed by a processor, performs the steps of the above character jump control method in a game.

For example, the steps of the above character jump control method in a game may include:

displaying a jump control in the graphical user interface; and controlling the virtual character to perform a jump operation corresponding to an air jump from a first starting jump height in response to a received trigger operation for the jump control during a free fall of the virtual character in performing a ground jump, where the first starting jump height is a current height of the virtual character in the game scene when the trigger operation is received, and the ground jump and the air jump are jump types with different acceleration modes.

In some examples, the air jump is of any one of the following jump types: a catapult jump type, a smooth jump type, a floating jump type and a teleport jump type.

In some examples, if the air jump is of the catapult jump type, the step of controlling the virtual character to perform a jump operation corresponding to an air jump from a first starting jump height includes:

controlling the virtual character to move upward from the first starting jump height to reach a first maximum speed corresponding to the air jump according to a first acceleration and a first acceleration time corresponding to the air jump;

controlling the virtual character to continue moving upwards from a height at which the first maximum speed is reached according to the first maximum speed until an upward motion speed drops to zero; and controlling the virtual character to perform a free-fall motion with a preset gravitational acceleration, where directions of the first acceleration and the preset gravitational acceleration are opposite, and a value of the first acceleration is greater than a value of the preset gravitational acceleration.

In some examples, if the air jump is of the smooth jump type or the floating jump type, the step of controlling the virtual character to perform a jump operation corresponding to an air jump from a first starting jump height includes:

controlling the virtual character to move upward from the first starting jump height to a second maximum speed corresponding to the air jump according to a second acceleration and a second acceleration time corresponding to the air jump;

controlling the virtual character to continue moving upwards, from a height at which the second maximum speed is reached, according to the second maximum speed, a lifting acceleration corresponding to the air jump and a preset gravitational acceleration until an upward motion speed drops to zero; and controlling the virtual character to perform a free-fall motion at the preset gravitational acceleration, where directions of the second acceleration and the preset gravitational acceleration are opposite, a value of the second acceleration is greater than a value of the preset gravitational acceleration, a direction of the lifting acceleration and a direction of the second acceleration are the same, and a value of the lifting acceleration is smaller than the value of the preset gravitational acceleration; and the value of the second acceleration corresponding to the smooth jump type is greater than the value of the second acceleration corresponding to the floating jump type, and the value of the lifting acceleration corresponding to the smooth jump type is smaller than the value of the lifting acceleration corresponding to the floating jump type.

In some examples, if the air jump is of the teleport jump type, the step of controlling the virtual character to perform a jump operation corresponding to an air jump from a first starting jump height includes:

calculating a motion track of the virtual character from the first starting jump height and an end point according to a preset teleport direction and a teleport distance corresponding to the air jump;

controlling the virtual character to hide on the motion track before the end point, and controlling the virtual character to appear at the end point; and controlling the virtual character to perform a free-fall motion at the preset gravitational acceleration from the end point.

In some examples, the method further includes:

controlling the virtual character to perform the jump operation corresponding to the air jump again from a second starting jump height in response to a received re-triggering operation for the jump control during the free fall of the virtual character in performing the air jump, where the second starting jump height is the current height of the virtual character in the game scene when the re-triggering operation is received.

In some examples, the method further includes:

updating a display mode of the jump control to indicate a remaining number of jumps of the air jump according to a number of jumps of the virtual character in performing the air jump.

In some examples, the method further includes:

updating the jump control to a non-interactive state if the remaining number of jumps is zero.

In some examples, if the air jump is of the floating jump type, before the step of controlling the virtual character to perform a free-fall motion at the preset gravitational acceleration, the method further includes:

controlling the virtual character to move downwards under an action of the lifting acceleration and the preset gravitational acceleration until an energy of the virtual character is exhausted.

In some examples, if the air jump is of the smooth jump type, before the step of controlling the virtual character to perform a free-fall motion at the preset gravitational acceleration, the method further includes:

controlling the virtual character to suspend at a height at which the upward motion speed drops to zero until an energy of the virtual character is exhausted.

In some examples, the method further includes:

updating a display state of the jump control to a lifting cancellation state if the virtual character moves under an action of the lifting acceleration; and controlling the virtual character to move at the preset gravitational acceleration in response to the trigger operation for the jump control in the lifting cancellation state.

In some examples, the method further includes:

controlling the virtual character to recover an energy during falling.

In some examples, if the air jump is of the smooth jump type, the method further includes:

controlling the virtual character to perform the jump operation corresponding to the air jump again from the second starting jump height in response to a received re-triggering operation for the jump control during the free fall of the virtual character in performing the air jump, where the second starting jump height is the current height of the virtual character in the game scene when the re-triggering operation is received.

In some examples, if the air jump is of the floating jump type, the method further includes:

controlling the virtual character to float downward from the second starting jump height under the action of the lifting acceleration and the preset gravitational acceleration in response to receiving the re-triggering operation for the jump control during the free fall of the virtual character in performing the air jump, where the second starting jump height is the current height of the virtual character in the game scene when the re-triggering operation is received.

In some examples, the method further includes:

updating a display mode of the jump control to indicate a remaining energy of the air jump according to the consumed energy and recovered energy of the virtual character in performing the air jump.

In some examples, the method further includes:

updating the jump control to a non-interactive state if a remaining energy of the virtual character is zero.

In the above manner, by displaying a jump control in the graphical user interface, the virtual character is controlled to perform a jump operation corresponding to an air jump from a first starting jump height in response to a received trigger operation for the jump control during a free fall of the virtual character in performing a ground jump, where the first starting jump height may be a current height of the virtual character in the game scene when the trigger operation is received, and the ground jump and the air jump are of jump types with different acceleration modes. The air jump is performed during the free fall of the virtual character in performing the ground jump. The air jump is different from the ground jump in acceleration mode, and there is obvious difference between the air jump and the ground jump, which makes the forms of air jump richer and improves the user experience.

The embodiments of the present disclosure provide a character jump control method in a game, which includes: displaying a jump control in the graphical user interface; and controlling the virtual character to perform a jump operation corresponding to an air jump from a first starting jump height in response to a received trigger operation for the jump control during a free fall of a ground jump performed by the virtual character. The first starting jump height may be a current height of the virtual character in the game scene when the trigger operation is received, and the ground jump and the air jump are of jump types with different acceleration modes. The air jump is performed during the free fall of the ground jump performed by the virtual. The acceleration modes of air jump and ground jump are different, and there is obvious difference between the air jump and the ground jump, which makes the forms of air jumps richer and improves the user experience.

From the several embodiments provided by the present disclosure, it is to be understood that the disclosed apparatuses and methods may be implemented in other ways. For example, the above-described apparatus embodiments are only schematic. For example, the division of the units is only a logical function division, and there may be another division mode in actual implementation. For example, a plurality of units or components may be combined or integrated into another system, or some features may be ignored or not performed. On the other hand, the shown or discussed mutual coupling, direct coupling or communication connection may be an indirect coupling or a communication connection through some interfaces, apparatuses or units, which may be in electrical, mechanical or other forms.

The units described as separate parts may or may not be physically separated, and the parts displayed as units may or may not be physical units, that is, they may be located in one place or distributed over a plurality of network units. Some or all of the units may be selected according to the actual needs to achieve the objectives of the embodiments.

In addition, each functional unit in each embodiment of the present disclosure may be integrated in one processing unit, or may physically exist separately, or two or more units may be integrated in one unit. The above-mentioned integrated units may be implemented in the form of hardware or hardware plus a software functional unit.

The integrated unit implemented in the form of the above-mentioned software functional unit may be stored in a computer-readable storage medium. The above-mentioned software functional unit stored in a storage medium includes several instructions to make a computer device (which may be a personal computer, a server, or a network device, etc.) or a processor execute some steps of the methods described in various embodiments of the present disclosure. The aforementioned storage media include: U disk, mobile hard disk, Read-Only Memory (ROM), Random Access Memory (RAM), magnetic disk, optical disc or other media that can store program codes.

The above are only the preferred embodiments of the present disclosure, and are not intended to limit the present disclosure. For a person skilled in the art, various modifications and changes may be made to the present disclosure. Any modification, equivalent replacement, improvement, etc. made within the spirit and principles of the present disclosure shall fall within the scope of protection of the present disclosure.

The present disclosure discloses a character jump control method and apparatus in a game, a terminal device and a medium, and relates to the technical field of human-computer interaction. The character jump control method in a game includes: displaying a jump control in the graphical user interface; and controlling the virtual character to perform a jump operation corresponding to an air jump from a first starting jump height in response to a received trigger operation for the jump control during a free fall of the virtual character in performing a ground jump, where the first starting jump height may be a current height of the virtual character in the game scene when the trigger operation is received, and the ground jump and the air jump are of jump types with different acceleration modes. The air jump is performed during the free fall of the virtual character in performing the ground jump. The air jump is different from the ground jump in acceleration mode, and there is obvious difference between the air jump and the ground jump, which makes the forms of air jump richer and improves the user experience.

In addition, it can be understood that the character jump control method and apparatus in a game, the terminal device and the medium of the present disclosure can be reproduced and can be used in various industrial applications. For example, the character jump control method and apparatus in a game, the terminal device and the medium provided by the present disclosure can be used in the technical field of human-computer interaction.

What is claimed is:

1. A character jump control method in a game, comprising:

displaying, by a terminal device, a jump control in a graphical user interface, wherein the graphical user interface is provided by the terminal device and the graphical user interface comprises a game scene with a virtual character; and during a free fall of the virtual character in performing a ground jump, in response to receiving a trigger operation for the jump control, controlling the virtual character to perform a jump operation corresponding to an air jump from a first starting jump height, wherein the first starting jump height is a current height of the virtual character in the game scene when the trigger operation is received, and the ground jump and the air jump are of jump types with different acceleration modes;

the air jump is of any one of following jump types: a catapult jump type, a smooth jump type, a floating jump type and a teleport jump type;

in response to determining that the air jump is of the smooth jump type or the floating jump type, the step of controlling the virtual character to perform the jump operation corresponding to the air jump from the first starting jump height comprises:

controlling the virtual character to move upward from the first starting jump height to reach a second maximum speed corresponding to the air jump according to a second acceleration and a second acceleration time corresponding to the air jump;

controlling the virtual character to continue moving upwards, from a height at which the second maximum speed is reached, according to the second maximum speed, a lifting acceleration corresponding to the air jump and a preset gravitational acceleration until an upward motion speed drops to zero; and controlling the virtual character to perform a free-fall motion at the preset gravitational acceleration, wherein directions of the second acceleration and the preset gravitational acceleration are opposite, a value of the second acceleration is greater than a value of the preset gravitational acceleration, directions of the lifting acceleration and the second acceleration are the same, and a value of the lifting acceleration is smaller than the value of the preset gravitational acceleration; and the value of the second acceleration corresponding to the smooth jump type is greater than the value of the second acceleration corresponding to the floating jump type, and the value of the lifting acceleration corresponding to the smooth jump type is smaller than the value of the lifting acceleration corresponding to the floating jump type.

2. The method according to claim 1, wherein in response to determining that the air jump is of the catapult jump type, the step of controlling the virtual character to perform the jump operation corresponding to the air jump from the first starting jump height comprises:

controlling the virtual character to move upward from the first starting jump height to reach a first maximum speed corresponding to the air jump according to a first acceleration and a first acceleration time corresponding to the air jump;

controlling the virtual character to continue moving upwards, from a height at which the first maximum speed is reached, according to the first maximum speed until an upward motion speed drops to zero; and controlling the virtual character to perform a free-fall motion at a preset gravitational acceleration, wherein directions of the first acceleration and the preset gravitational acceleration are opposite, and a value of the first acceleration is greater than a value of the preset gravitational acceleration.

3. The method according to claim 2, wherein the method further comprises:

during the free fall of the virtual character in performing the air jump, in response to receiving a re-triggering operation for the jump control, controlling the virtual character to perform the jump operation corresponding to the air jump for a second time from a second starting jump height, wherein the second starting jump height is the current height of the virtual character in the game scene when the re-triggering operation is received.

4. The method according to claim 1, wherein in response to determining that the air jump is of the teleport jump type, the step of controlling the virtual character to perform the jump operation corresponding to the air jump from the first starting jump height comprises:

calculating a motion track of the virtual character from the first starting jump height and an end point of the virtual character according to a preset teleport direction and a teleport distance corresponding to the air jump;

controlling the virtual character to hide on the motion track before the end point, and controlling the virtual character to appear at the end point; and controlling the virtual character to perform a free-fall motion at a preset gravitational acceleration from the end point.

5. The method according to claim 4, further comprising:

determining, by the terminal device, a current position of the virtual character; and by taking the current position of the virtual character as a start point and using preset planning rules according to the start point, the teleport direction and the teleport distance, determining the motion track of the virtual character from the first starting jump height and the end point of the virtual character.

6. The method according to claim 1, wherein the method further comprises:

updating a display mode of the jump control to indicate a remaining number of jumps of the air jump according to a number of jumps that the virtual character performs the air jump.

7. The method according to claim 6, wherein the method further comprises:

updating the jump control to a non-interactive state in response to determining that the remaining number of jumps is zero.

8. The method according to claim 1, wherein in response to determining that the air jump is of the floating jump type, the method further comprises:

controlling the virtual character to move downwards under an action of the lifting acceleration and the preset gravitational acceleration until an energy of the virtual character is exhausted.

9. The method according to claim 1, wherein in response to determining that the air jump is of the smooth jump type, the method further comprises:

controlling the virtual character to suspend at a height at which the upward motion speed drops to zero until an energy of the virtual character is exhausted.

10. The method according to claim 1, wherein the method further comprises:

updating a display state of the jump control to a lifting cancellation state in response to determining that the virtual character moves under an action of the lifting acceleration; and controlling the virtual character to move at the preset gravitational acceleration in response to the trigger operation for the jump control in the lifting cancellation state.

11. The method according to claim 10, wherein the method further comprises:

controlling the virtual character to recover an energy during falling.

12. The method according to claim 1, wherein in response to determining that the air jump is of the smooth jump type, the method further comprises:

during the free fall of the virtual character in performing the air jump, in response to receiving a re-triggering operation for the jump control, controlling the virtual character to perform the jump operation corresponding to the air jump for a second time from the second starting jump height, wherein the second starting jump height is the current height of the virtual character in the game scene when the re-triggering operation is received.

13. The method according to claim 1, wherein in response to determining that the air jump is of the floating jump type, the method further comprises:

during the free fall of the virtual character in performing the air jump, in response to receiving the re-triggering operation for the jump control, controlling the virtual character to float downward from the second starting jump height under an action of the lifting acceleration and the preset gravitational acceleration;

wherein the second starting jump height is the current height of the virtual character in the game scene when the re-triggering operation is received.

14. The method according to claim 1, wherein the method further comprises:

updating a display mode of the jump control to indicate a remaining energy of the air jump according to consumed energy and recovered energy of the virtual character in performing the air jump.

15. The method according to claim 1, wherein the method further comprises:

updating the jump control to a non-interactive state in response to determining that a remaining energy of the virtual character is zero.

16. A terminal device, comprising a memory and a processor, wherein the memory stores a computer program executable by the processor, and the processor, when executing the computer program, implements a character jump control method according to claim 1.

17. A non-transitory computer-readable storage medium, wherein a computer program is stored on the storage medium, and the computer program, when read and executed, implements a character jump control method according to claim 1.

18. The method according to claim 1, wherein a switch control is displayed on the graphical user interface, and the jump types are switched in response to a trigger operation for the switch control.

* * * * *